United States Patent
Roderick

(10) Patent No.: US 10,264,224 B2
(45) Date of Patent: Apr. 16, 2019

(54) DEVICE AND METHOD FOR CHANGING THE TEXTURE OF PROJECTED LIGHT

(71) Applicant: James A. Roderick, New York, NY (US)

(72) Inventor: James A. Roderick, New York, NY (US)

( * ) Notice: Subject to any disclaimer, the term of this patent is extended or adjusted under 35 U.S.C. 154(b) by 0 days.

(21) Appl. No.: 15/474,376

(22) Filed: Mar. 30, 2017

(65) Prior Publication Data

US 2017/0284638 A1 Oct. 5, 2017

Related U.S. Application Data

(60) Provisional application No. 62/316,802, filed on Apr. 1, 2016.

(51) Int. Cl.
*H04N 9/31* (2006.01)

(52) U.S. Cl.
CPC ............ *H04N 9/3102* (2013.01); *H04N 9/31* (2013.01)

(58) Field of Classification Search
CPC .......... F21V 14/003; F21V 29/60; F21V 9/04; F21V 9/06
USPC ........................................................ 362/294
See application file for complete search history.

(56) References Cited

U.S. PATENT DOCUMENTS

| | | | | |
|---|---|---|---|---|
| 5,075,824 A * | 12/1991 | Tan | ...................... | G02B 6/0001 349/56 |
| 5,709,463 A * | 1/1998 | Igram | .................... | F21V 5/002 349/161 |
| 6,109,767 A * | 8/2000 | Rodriguez | ............. | G03B 21/16 353/52 |
| 7,358,657 B2 * | 4/2008 | Koelger | ................ | G03B 21/16 313/113 |
| 7,488,096 B2 * | 2/2009 | Childers | ................ | G03B 21/16 362/218 |
| 2002/0015305 A1 * | 2/2002 | Bornhorst | ............. | F21S 10/007 362/293 |
| 2005/0168996 A1 * | 8/2005 | Koegler, III | ........... | G03B 21/16 362/341 |
| 2005/0275960 A1 * | 12/2005 | Wu | .......................... | F21V 7/22 359/883 |
| 2011/0164416 A1 * | 7/2011 | Pujol | ...................... | F21V 5/008 362/235 |

* cited by examiner

*Primary Examiner* — Bryon T Gyllstrom
(74) *Attorney, Agent, or Firm* — Fox Rothschild LLP

(57) ABSTRACT

A lighting template usable in connection with standard theatrical lights is provided. The lighting template contains a LCD adapted to receive and reproduce video output thereon. The lighting template provides a body adapted to mount to a theatrical light so that the LCD is disposed within the focal plane thereof. Thereby a lighting designer may selectively control the video output so as to manipulate the projected light through the LCD, affordably creating animated projections from the theatrical light.

20 Claims, 2 Drawing Sheets

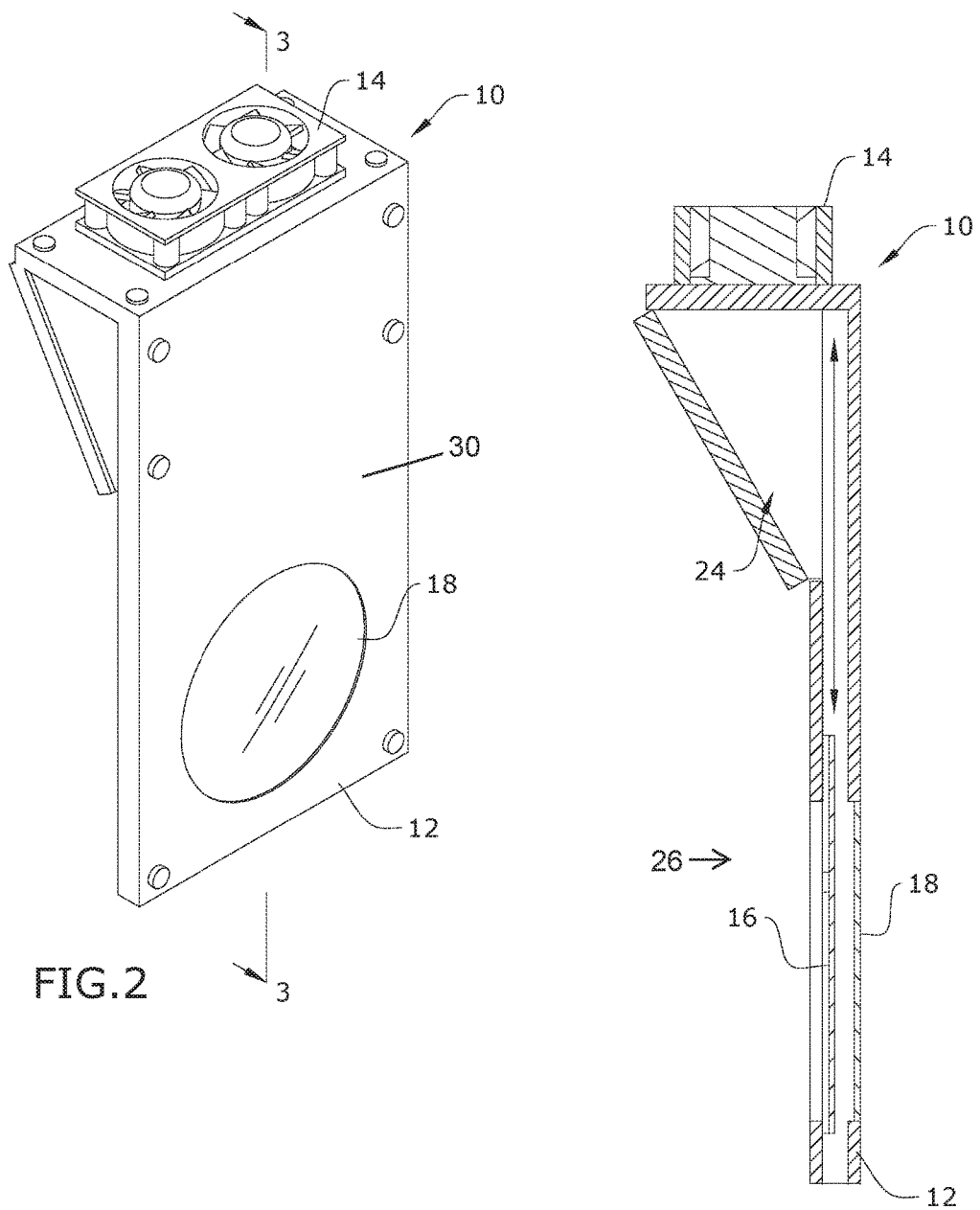

DEVICE AND METHOD FOR CHANGING THE TEXTURE OF PROJECTED LIGHT

CROSS-REFERENCE TO RELATED APPLICATION

This application claims the benefit of priority of U.S. provisional application No. 62/316,802, filed 1 Apr. 2016, the contents of which are herein incorporated by reference.

BACKGROUND OF THE INVENTION

The present invention relates to lighting instruments and, more particularly, a lighting template having a LCD adapted to reproduce video output, wherein the lighting template may be placed inside or in front of a light source so that by controlling the video output the texture of the projected light may be manipulated.

Lighting designers use gobos, which are physical stencil or templates that are placed inside or in front of a light source, to control the shape of the emitted light. Lighting designers are limited, however, by the expense of glass gobos, which generally offer the highest image fidelity but are the most fragile, and the labor it takes to manually change the gobos in standard theatrical lights in order to create varying lighting effects.

Furthermore, currently, to animate gobos there are only limited mechanical ways of doing so, in part because of the limited kinds of projectors available that afford an organic feel. Specifically, the gobo is placed in the focal plane of a lantern (generally an ellipsoidal reflector spotlight) by inserting the gobo in an accessory slot thereof, upside-down and back-to-front. The desired pattern is then projected right-side up by the lantern onto whatever surface it is pointed at. As a result, current gobos or lighting accessories require many moving parts to animate the imagery of the gobo(s), which in turn limits lighting designer's ability to create visually because of the labor required to change gobos and other lighting accessories to animate lighting designs.

As can be seen, there is a need for a lighting template used with standard theatrical lights, such as an ellipsoidal reflector spotlight, wherein the lighting template contains a LCD adapted to receive and reproduce video content thereon. Thereby a lighting designer is enabled to manipulate the projected light by changing the video content being reproduced by the LCD, allowing unlimited ways of manipulating the light through controlling the video content. Furthermore, standard theatrical lighting units can also be used to affordably create animated projections.

SUMMARY OF THE INVENTION

In one aspect of the present invention, a device for manipulating projected light through a lantern adapted for projecting light therefrom, wherein a focal point is provided by the lantern, the device including a body having an aperture; and a LCD configured to receive and reproduce video output, wherein the LCD is disposed within the aperture, and wherein the body is dimensioned and adapted to mount the lantern so that the LCD is disposed in the focal point.

In another aspect of the present invention, a system for manipulating projected light through a lantern includes a lantern configured for projecting light therefrom, wherein a focal point is provided; and a lighting template having a body having an aperture; and a LCD configured to receive and reproduce video output, wherein the LCD is disposed within the aperture, and wherein the body is dimensioned and adapted to mount the lantern so that the LCD is disposed in the focal point, wherein the lantern provides an accessory slot to communicate the LCD and the focal point, wherein the body is dimensioned and adapted to slide into the accessory slot, and further including a dichroic glass disposed within the aperture, wherein the dichroic glass is adjacent to and spaced apart from the LCD by a void, and further providing a cooling element configured to urge cooled air into the void.

These and other features, aspects and advantages of the present invention will become better understood with reference to the following drawings, description and claims.

BRIEF DESCRIPTION OF THE DRAWINGS

FIG. 2 is a perspective view of an exemplary embodiment of the present invention; and FIG. 3 is a section view of an exemplary embodiment of the present invention, taken along line 3-3 in FIG. 2.

DETAILED DESCRIPTION OF THE INVENTION

Figure 1:
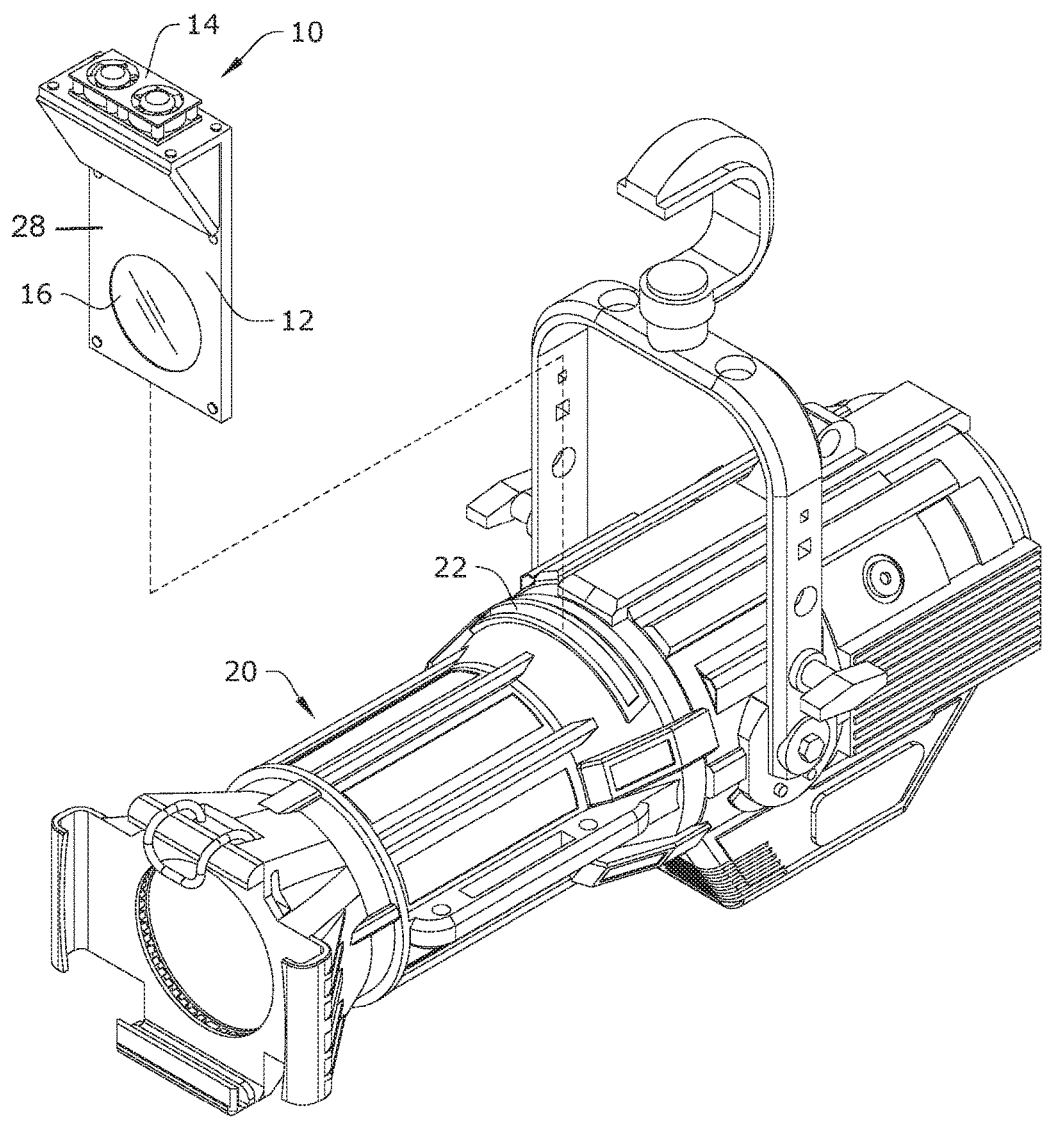
FIG. 1 is an exploded view of an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a lighting template usable in connection with standard theatrical lights, wherein the lighting template contains a LCD adapted to receive and reproduce video output thereon. The lighting template provides a body adapted to mount to a theatrical light so that the LCD is disposed within the focal plane thereof. Thereby a lighting designer may selectively control the video output so as to manipulate the projected light through the LCD, affordably creating animated projections from the theatrical light.

Referring to FIGS. 1 through 3, the present invention provides a lighting template 10 or gobo used in connection with a lantern 20 to manipulate light, which is cast over a space or object. The lantern 20 may be an ellipsoidal reflector projector, or other light source adapted for placing the lighting template in front of a light source.

The lighting template 10 has a body of any suitable material and shape adapted to slide into an accessory slot 22 of the lantern 20. The lighting template 10 may provide a cooling element 14. The cooling element 14 may be cooling fans or the like.

The lighting template 10 may provide a liquid crystal display (LCD) 16 that would be disposed within the focal plane of the lantern 20 when the lighting template 10 is secured within the accessory slot 22. The LCD 16 is adapted to receive and reproduce video output or content. The lighting template 10 may provide control circuitry 24 electrically connected to the LCD 16 to selectively control the reproduction of the video output. The LCD 16 may have no backlight. An ultraviolet and/or inferred (IR UV) blocking dichroic glass 18 may also be disposed within the focal plane of the lantern 20 when the lighting template 10 is secured within the accessory slot 22.

In certain embodiments, the body 12 may provide opposing, spaced apart first and second surfaces 28 and 30, wherein an aperture 26 passes through both surfaces 28 and 30. In certain embodiments, adjacent to the aperture of the first surface 28 is the LCD 16, and adjacent to the aperture 26 of the second surface 30 is the dichroic glass 18 so that the LCD 16 and the dichroic glass 18 are spaced apart. Through said space the cooling element 14 may urge cooled air.

The lantern 20 may project light to pass through the dichroic glass 18 and the LCD 16, wherein the LCD 16 is adapted to change the passing light therethrough by selectively controlling the video output reproduced by the LCD 16, thereby manipulating the projected image out of the lantern 20. The video output, for example, may be a still, captured image whereby the lighting designer may selectively control the inherent opacity of the LCD 16 so as to produce an adjustable lighting effect. The blocking dichroic glass 18 limits the IR UV light from hitting the LCD 16, while also keeping it cooler.

A method of using the present invention may include the following. The lighting template 10 disclosed above may be provided. The accessory would then be placed into the theatrical lighting unit 20 and video signal would be attached to the LCD 16. A lighting or projection designer could use the lighting template 10 to create the same effects they currently use gobos for but wherein the present invention allows for them to change the gobo instantly and manipulate and animate the gobo the way one manipulates and animates video, giving the designer unlimited possibilities of shaping and texturing the projected light.

Also, projection designers can now use standard theatrical light units as a more organic source of a projection then a standard projector. Additionally, the present invention could be applied to other styles of lighting instruments for producing artistic compositions.

It should be understood, of course, that the foregoing relates to exemplary embodiments of the invention and that modifications may be made without departing from the spirit and scope of the present invention.

What is claimed is:

1. A device for manipulating projected light through a lantern configured for projecting light therefrom, wherein a focal point and an operatively associated slot is provided by the lantern, the device comprising:
   a body having a first and a second surface, and an aperture extending through the body and communicating with the first and second surfaces, the aperture configured and adapted to permit the projected light to pass there through; and
   a LCD configured to receive and reproduce video output, wherein the LCD is disposed within the aperture so that the LCD is within the projected light of the lantern when the body is inserted within the slot in the lantern, wherein the first and second surfaces are configured and adapted to be removably insertable within the slot provided by the lantern to locate the aperture and LCD panel within the projected light of the lantern.

2. The device of claim 1, further comprising a dichroic glass disposed within the aperture.

3. The device of claim 2, wherein the dichroic glass is adjacent to and spaced apart from the LCD by a void.

4. The device of claim 3, further providing a cooling element configured to urge cooled air into the void.

5. The device of claim 1, wherein the slot communicates with an interior and an exterior of the lantern.

6. The device of claim 1, wherein the first and second surfaces insertable within the slot have a rectangular cross-section.

7. A system for manipulating projected light through a lantern, comprising:
   a lantern configured for projecting light through a focal point and from the lantern;
   the lantern having a slot communicating with an interior and an exterior of the lantern, the slot adapted and configured to communicate with the projecting light of the lantern; and a lighting template comprising:
   a body having an aperture; and
   a LCD configured to receive and reproduce video output, wherein the LCD is disposed within the aperture, and wherein the body is dimensioned and adapted to be removably insertable within said slot so that the LCD when said body is inserted with said slot is disposed in the projecting light of the lantern.

8. The system of claim 7, wherein the slot has a rectangular cross section.

9. The system of claim 8, wherein the body is dimensioned to slide into the slot.

10. The system of claim 9, further comprising a dichroic glass disposed within the aperture.

11. The system of claim 10, wherein the dichroic glass is adjacent to and spaced apart from the LCD by a void.

12. The system of claim 11, further providing a cooling element configured to urge cooled air into the void.

13. A lighting template for manipulating light projecting through and from a lantern, wherein the lantern has a housing and a slot in the housing in communication with the exterior of the lantern and an interior portion of the lantern where the light projects through the lantern, the lighting template comprising:
   a body having a first and a second surface, and an aperture extending through the body and in communication with the first and second surfaces; and
   a LCD configured to receive and reproduce video output, wherein the LCD is disposed within the aperture so that the LCD is located within the light projecting through the lantern when the body is inserted within the slot in the housing of the lantern,
   wherein the first and second surfaces are configured and adapted to be removably insertable within the slot in the housing of the lantern to locate the aperture and LCD within the light projecting through the lantern.

14. The lighting template of claim 13, further comprising a dichroic glass disposed within the aperture.

15. The lighting template of claim 14, wherein the dichroic glass is adjacent to and spaced apart from the LCD by a void.

16. The lighting template of claim 15, further providing a cooling element configured to urge cooled air into the void.

17. The lighting template of claim 13, wherein the first and second surfaces insertable within the slot have a rectangular cross-section.

18. The lighting template of claim 13, further comprising control circuitry disposed within the body and electrically connected to the LCD to selectively control the video output of the LCD.

19. The lighting template of claim 13, wherein the body comprises a first wall having the first surface and a second wall having the second surface, the first wall separated from the second wall by a distance forming a cavity there between, the aperture extending through the first wall and the second wall, wherein the LCD panel is disposed in the cavity between the first wall and the second wall.

20. The lighting template of claim 19, wherein the first and second walls are configured and adapted to be insertable within the slot in the housing of the lantern.

\* \* \* \* \*